(12) United States Patent
Hsu et al.

(10) Patent No.: US 11,579,397 B2
(45) Date of Patent: Feb. 14, 2023

(54) PERISCOPE OPTICAL MODULE

(71) Applicant: TDK TAIWAN CORP., Taoyuan (TW)

(72) Inventors: Chen-Er Hsu, Taoyuan (TW);
Chin-Hsien Lee, Taoyuan (TW);
Chih-Wei Weng, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 305 days.

(21) Appl. No.: 16/727,510

(22) Filed: Dec. 26, 2019

(65) Prior Publication Data

US 2020/0209607 A1    Jul. 2, 2020

Related U.S. Application Data

(60) Provisional application No. 62/785,593, filed on Dec. 27, 2018.

(30) Foreign Application Priority Data

Dec. 20, 2019   (EP) ..................................... 19218896

(51) Int. Cl.
  *G02B 7/02*   (2021.01)
  *G02B 3/14*   (2006.01)
  (Continued)

(52) U.S. Cl.
  CPC .................. *G02B 7/02* (2013.01); *G02B 3/14* (2013.01); *G02B 6/3514* (2013.01); *G02B 7/08* (2013.01);
  (Continued)

(58) Field of Classification Search
  CPC .......... G02B 3/14; G02B 6/3514; G02B 7/08; G02B 7/09; G02B 7/182; G02B 26/0816; G02B 7/646; G02B 23/08; H04N 5/2254; H04N 5/2259; H04N 5/23287; H04N 5/2257; G03B 2205/0069
  See application file for complete search history.

(56) References Cited

U.S. PATENT DOCUMENTS

2009/0046366 A1\* 2/2009 Take .............. G02B 15/145113
  359/557
2009/0141365 A1\* 6/2009 Jannard .......... G02B 15/143105
  359/666

(Continued)

*Primary Examiner* — William R Alexander
*Assistant Examiner* — Sharrief I Broome
(74) *Attorney, Agent, or Firm* — Muncy, Geissler, Olds & Lowe, P.C.

(57) ABSTRACT

A periscope optical module is provided. The periscope optical module includes a first optical element, a second optical element, and a third optical element. The first optical element has a first optical axis. The second optical element corresponds to the first optical element and adjusts a forward direction of a light. The third optical element has a second optical axis. The third optical element corresponds to the second optical element. The light passes through the first optical element, the second optical element, and the third optical element consecutively. The first optical axis is not parallel to the second optical axis. A minimum size of the first optical element in a direction that is perpendicular to the first optical axis is larger than a maximum size of the third optical element in a direction of the first optical axis.

20 Claims, 12 Drawing Sheets

(51) Int. Cl.
  *G02B 7/08* (2021.01)
  *H04N 5/225* (2006.01)
  *H04N 5/232* (2006.01)
  *G02B 6/35* (2006.01)
  *G02B 7/182* (2021.01)
  *G02B 26/08* (2006.01)
  *G02B 7/09* (2021.01)
  *G02B 27/64* (2006.01)
  *G02B 23/08* (2006.01)

(52) U.S. Cl.
  CPC ............... *G02B 7/09* (2013.01); *G02B 7/182* (2013.01); *G02B 26/0816* (2013.01); *G02B 27/646* (2013.01); *H04N 5/2254* (2013.01); *H04N 5/2257* (2013.01); *H04N 5/2259* (2013.01); *H04N 5/23287* (2013.01); *G02B 23/08* (2013.01); *G03B 2205/0069* (2013.01)

(56) References Cited

U.S. PATENT DOCUMENTS

| | | | | |
|---|---|---|---|---|
| 2015/0131161 | A1* | 5/2015 | Lee | G02B 3/14 |
| | | | | 359/666 |
| 2018/0299651 | A1* | 10/2018 | Yu | H02K 41/0354 |
| 2018/0367714 | A1* | 12/2018 | Im | H04N 5/23287 |
| 2019/0004328 | A1* | 1/2019 | Lee | G02B 27/646 |
| 2020/0409033 | A1* | 12/2020 | Lee | G02B 7/18 |

* cited by examiner

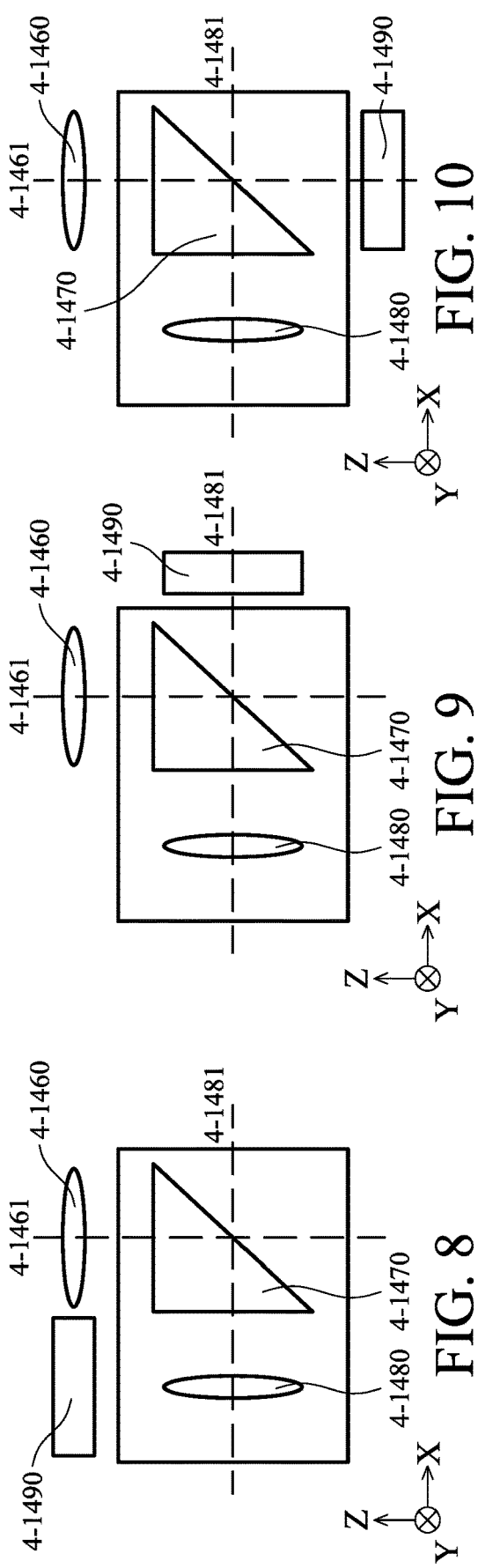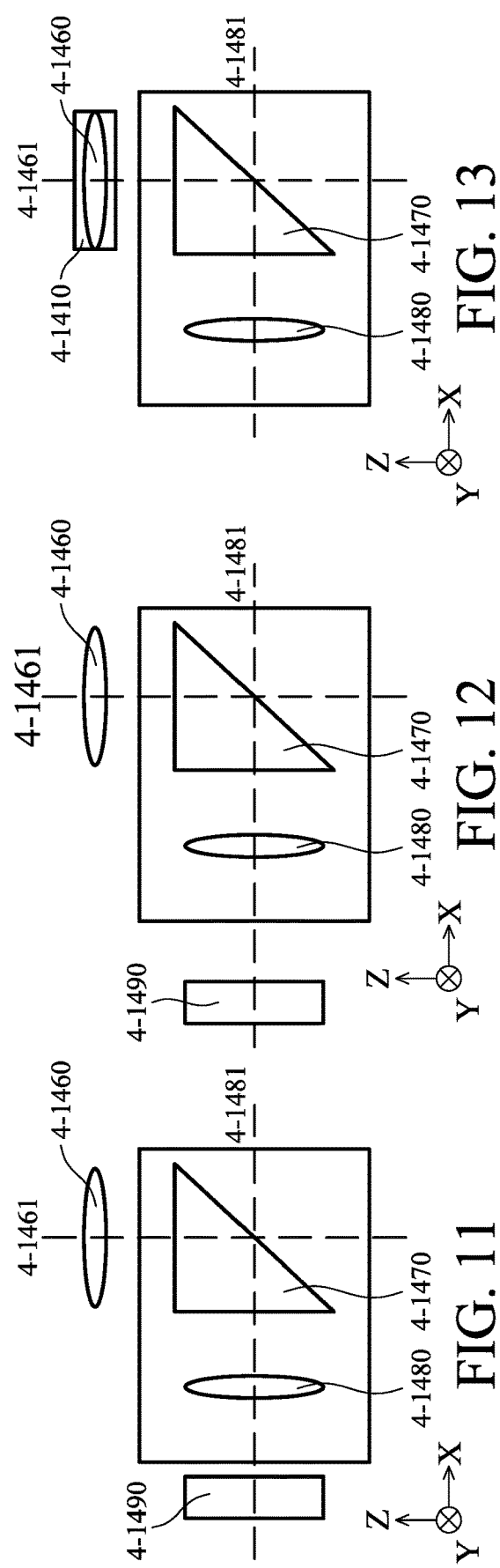

PERISCOPE OPTICAL MODULE

CROSS-REFERENCE TO RELATED APPLICATIONS

The present application claims priority of U.S. Provisional Patent Application No. 62/785,593, filed on Dec. 27, 2018 and European Patent Application No. 19218896.9 filed on Dec. 20, 2019, which are incorporated by reference herein in their entireties.

BACKGROUND OF THE DISCLOSURE

Field of the Disclosure

The present disclosure relates to an optical module, and more particularly to a periscope optical module.

Description of the Related Art

Nowadays, electronic devices that can be used for capturing pictures or video tend to be equipped with more and more lenses. Meanwhile, miniaturization of the electronic device still has to be taken into account. Therefore, the periscope optical module has been developed.

Lenses may essentially be divided into two types: wide-angle lenses with a short focal length, and long-focus lenses with a long focal length. The wide-angle lenses and the long-focus lenses have different functions. For example, if the focal length of a lens is shorter, more scenes may be included in the images or videos. To satisfy different aspects of the quality of the images or the videos (such as shooting range, depth of field, and the like), the electronic device may be provided with lenses with different focal lengths. However, placing a lens with a long focal length into a periscope optical module that already includes multiple lenses may still increase the thickness of the electronic device. Therefore, in order to place a lens with a long focal length into the periscope optical module without increasing the thickness of the electronic device, a better solution is needed.

BRIEF SUMMARY OF THE DISCLOSURE

According to some embodiments of the disclosure, a periscope optical module is provided.

A periscope optical module is provided. The periscope optical module includes a first optical element, a second optical element, and a third optical element. The first optical element has a first optical axis. The second optical element corresponds to the first optical element and adjusts a forward direction of a light. The third optical element has a second optical axis. The third optical element corresponds to the second optical element. The light passes through the first optical element, the second optical element, and the third optical element consecutively. The first optical axis is not parallel to the second optical axis. A minimum size of the first optical element in a direction that is perpendicular to the first optical axis is larger than a maximum size of the third optical element in a direction of the first optical axis.

According to some embodiments, the minimum size of the first optical element in the direction that is perpendicular to the first optical axis is larger than a maximum size of the second optical element in a direction of the second optical axis. According to some embodiments, the maximum size of the second optical element in the direction of the second optical axis is larger than the maximum size of the third optical element in the direction of the first optical axis.

According to some embodiments, a focal length of the first optical element is positive and a focal length of the third optical element is negative. According to some embodiments, a focal length of the first optical element is negative and a focal length of the third optical element is positive.

According to some embodiments, the periscope optical module further includes an aperture located between the first optical element and the second optical element or between the second optical element and the third optical element. According to some embodiments, at least one of the first optical element and the third optical element includes a cutting portion.

According to some embodiments, the periscope optical module further includes a holder holding the first optical element. The holder overlaps the second optical element when viewed along the first optical axis. According to some embodiments, the periscope optical module further includes a first driving assembly driving the first optical element to move relative to the second optical element. According to some embodiments, the first driving assembly further includes a plurality of driving components, and the second optical element is located between the driving components when viewed along a direction that is perpendicular to the first optical axis.

According to some embodiments, the first driving assembly overlaps the third optical element when viewed along the first optical axis. According to some embodiments, the second optical element is located between the first driving assembly and the third optical element when viewed along a direction that is perpendicular to the first optical axis. According to some embodiments, the second optical element is located between the first driving assembly and the first optical element when viewed along the first optical axis. According to some embodiments, the third optical element is located between the second optical element and the first driving assembly when viewed along a direction that is perpendicular to the first optical axis. According to some embodiments, the periscope optical module further includes a liquid lens driving assembly. The first optical element includes a liquid lens and the liquid lens driving assembly alters a focal length of the liquid lens. According to some embodiments, the first driving assembly drives the liquid lens driving assembly and the liquid lens to move relative to the second optical element at the same time. According to some embodiments, the periscope optical module further includes a bottom and a second driving assembly. The bottom corresponds to the second optical element. The second driving assembly is disposed on the bottom, and the second driving assembly drives the second optical element to move or rotate. According to some embodiments, the periscope optical module further includes a third driving assembly driving the third optical element to move relative to the second optical element.

An optical system is provided. The optical system includes a periscope optical module and an optical element driving module. The optical element driving module and the second optical element are arranged along a direction that is perpendicular to the first optical axis. Alternatively, the optical element driving module and the second optical element are arranged along a direction of the second optical axis.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 8 to FIG. 13 are different configurations of the first driving assembly in accordance with some embodiments of this disclosure.

DETAILED DESCRIPTION OF THE DISCLOSURE

The following disclosure provides many different embodiments, or examples, for implementing different features of the provided subject matter. Specific examples of components and arrangements are described below to simplify this disclosure. These are, of course, merely examples and are not intended to be limiting. For example, the formation of a first feature "on" or "above" a second feature in the description that follows may include embodiments in which the first and second features are formed in direct contact, and may also include embodiments in which additional features may be formed between the first and second features, so that the first and second features may not be in direct contact. Ordinal terms such as "first", "second", etc., used in the description and in claims do not by themselves connote any priority, precedence, or order of one element over another, but are used merely as labels to distinguish one element from another element having the same name. In addition, in different examples of this disclosure, symbols or letters may be used repeatedly.

Furthermore, spatially relative terms, such as "above" and the like, may be used herein for ease of description to describe one element or feature's relationship to another element or feature as illustrated in figures. The spatially relative terms are intended to encompass different orientations of the device in use or operation in addition to the orientation depicted in figures. The apparatus may be otherwise oriented (rotated 90 degrees or at other orientations) and the spatially relative descriptors used herein may likewise be interpreted accordingly.

The embodiments of this disclosure are described with the drawings.

Figure 1:
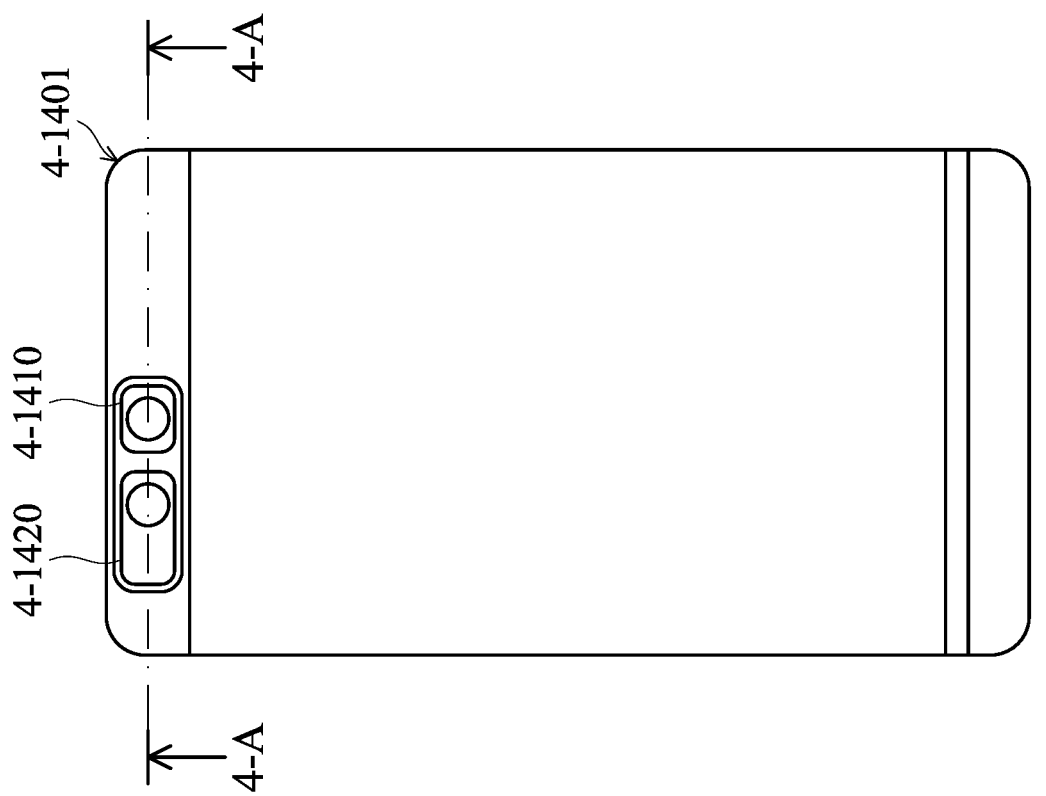
FIG. 1 is a schematic view of an electronic device equipped with an optical system in accordance with some embodiments of this disclosure.

FIG. 1 is a schematic view of an electronic device 4-1401 equipped with an optical system 4-1402 in accordance with some embodiments of this disclosure. In FIG. 1, the electronic device is a smart phone, but this disclosure is not limited thereto. The optical system 4-1402 includes an optical element driving module 4-1410 and a periscope optical module 4-1420.

Figure 2:
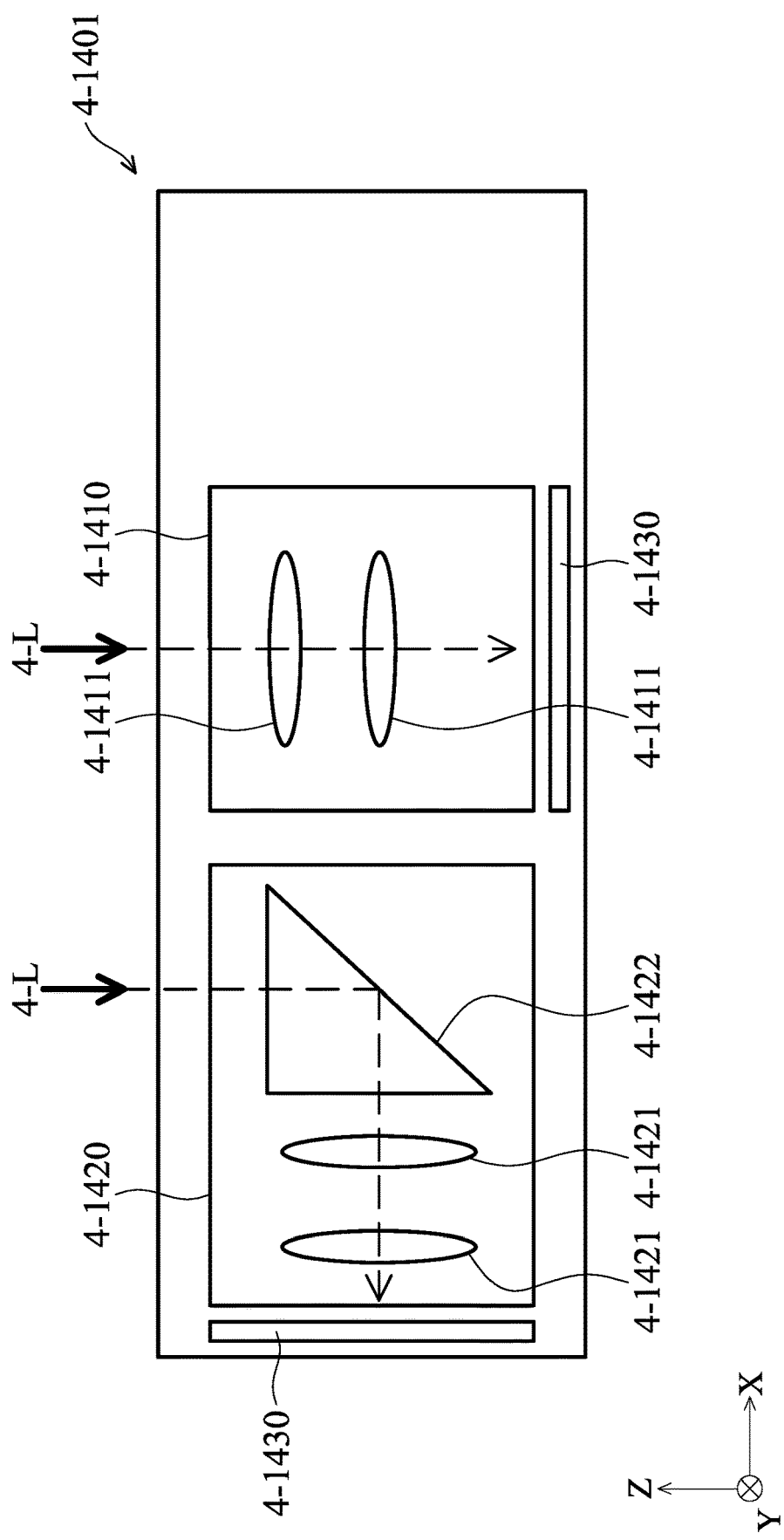
FIG. 2 is a cross-sectional view illustrated along line 4-A-4-A in FIG. 1.

FIG. 2 is a cross-sectional view illustrated along line 4-A-4-A in FIG. 1. In FIG. 2, the forward direction of a light 4-L enters the electronic device 4-1401 is indicated by an arrow. After the light 4-L passes through the optical element driving module 4-1410 and the periscope optical module 4-1420, imaging may be accomplished on two light-detection elements 4-1430 (e.g. charge-coupled detector, CCD). Additionally, the image may be transferred to a processor (not shown) to be further processed.

The optical element driving module 4-1410 includes one or more optical element(s) 4-1411. A driving mechanism is included in the optical element driving module 4-1410 for driving the optical element(s) 4-1411 to move. The arrangement direction of the optical element(s) 4-1411 is parallel to the thickness direction of the electronic device 4-1401. If the number of the optical element(s) 4-1411 is increased, then the thickness of the electronic device 4-1401 is increased.

The periscope optical module 4-1420 includes one or more optical element(s) 4-1421 and a reflecting element 4-1422. By placing the reflecting element 4-1422, the direction of the light 4-L may be changed so that the arrangement direction of the optical element(s) 4-1421 is substantially perpendicular to the thickness direction of the electronic device 4-1401.

When a consumer is shopping for an electronic device, both the appearance and the image function are important factors. A user tends to choose an electronic device that is thin and performs well in capturing images. To enhance the shooting quality, the number of the optical element(s) may be increased. To achieve miniaturization and to place more optical elements, the periscope optical module begins to be developed prosperously.

As described above, the arrangement direction of the optical element(s) 4-1421 in the periscope optical module 4-1420 is different than the arrangement direction of the optical element(s) 4-1411 in the periscope optical module 4-1410. In the periscope optical module 4-1420, the electronic device 4-1401 may be provided with multiple optical elements 4-1421 without affecting the thickness of the electronic device 4-1401 because the arrangement direction of the optical elements 4-1421 is substantially perpendicular to the thickness direction of the electronic device 4-1401.

To sum up, as shown in FIG. 2, when the optical elements 4-1411 of the optical element driving module 4-1410 have the same number and the same size as the optical elements 4-1421 of the periscope optical module 4-1420, the thickness of the periscope optical module 4-1420 is smaller than the thickness of the optical element driving module 4-1410. Thus, selecting the periscope optical module 4-1420 may avoid increasing the thickness of the electronic device 4-1401. In other words, for two electronic devices having the same thickness but equipped with different optical modules, the one equipped with the periscope optical module 4-1420 may hold more optical elements than the one equipped with the optical element driving module 4-1410.

However, for an optical element with a long focal length or a large size, even if it is placed in the periscope optical module 4-1420, the thickness of the electronic device 4-1401 may still be increased. Thus, a periscope optical module for holding an optical element with a long focal length or a large size is provided in this disclosure.

Figure 3:
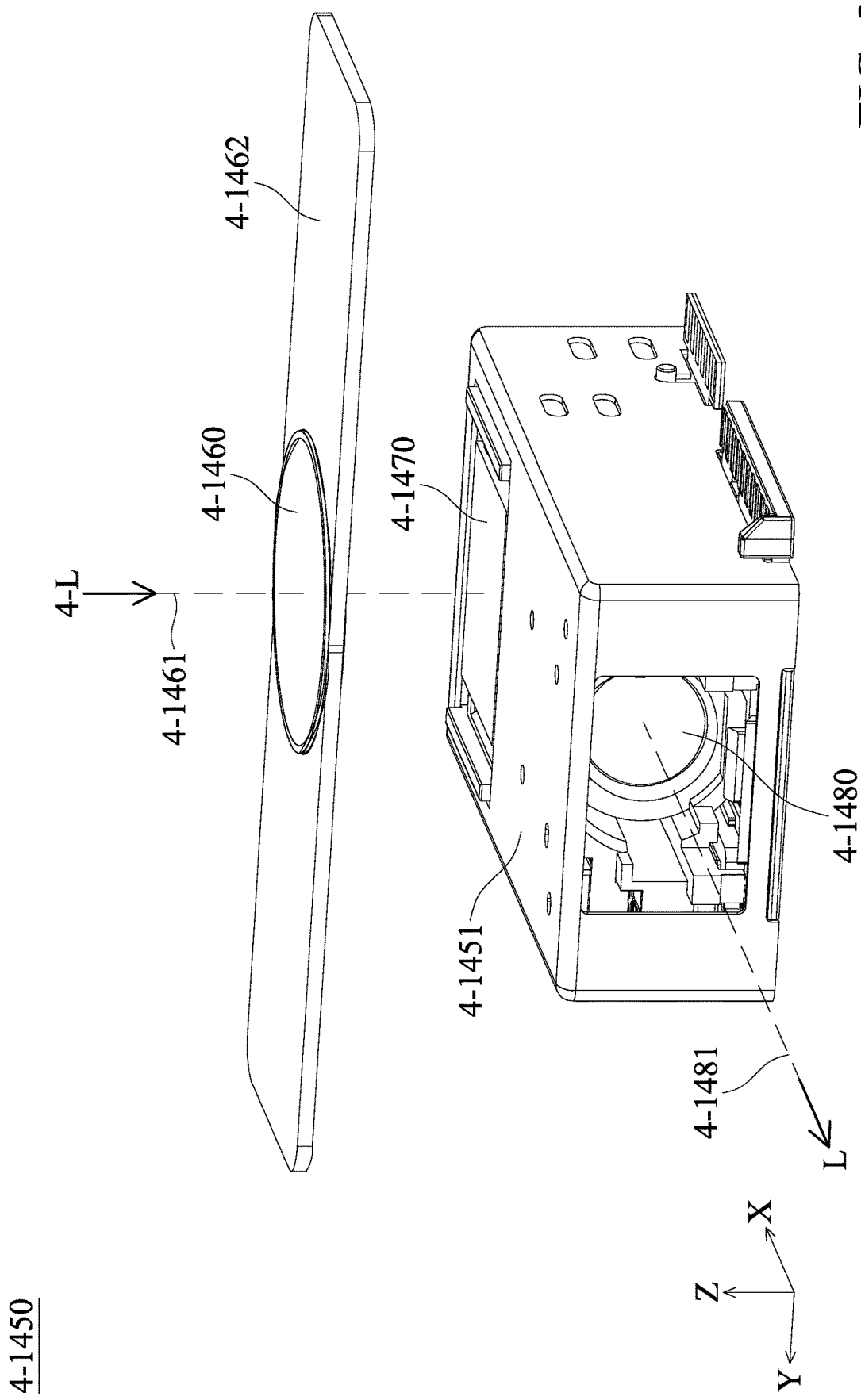
FIG. 3 is a perspective view of a periscope optical module in accordance with some embodiments of this disclosure.

FIG. 3 is a perspective view of a periscope optical module 4-1450 in accordance with some embodiments of this disclosure. The periscope optical module 4-1450 includes a case 4-1451, a first optical element 4-1460, a holder 4-1462, a second optical element 4-1470, and a third optical element 4-1480. When the light 4-L enters the periscope optical module 4-1450, the light 4-L passes through the first optical element 4-1460, the second optical element 4-1470, and the third optical element 4-1480 consecutively.

The first optical element 4-1460 may be an optical element that has longer focal length or bigger size than the third optical element 4-1480, such as a long-focus lens. The first optical element 4-1460 is received in the holder 4-1462.

The second optical element 4-1470 and the third optical element 4-1480 may be protected by the case 4-1451. The shape and the size of the case 4-1451 may be changed arbitrarily. The second optical element 4-1470 has similar features to the reflecting element 4-1422 of FIG. 2. The second optical element 4-1470 may be a mirror, a refractive prism or a beam splitter, etc. To ensure that as much the light 4-L passing through the first optical element 4-1460 as possible is received within the range of the second optical element 4-1470, the second optical element 4-1470 is located under the first optical element 4-1460. Additionally, the position of the second optical element 4-1470 corresponds to the position of the first optical element 4-1460. After the light 4-L passes through the first optical element 4-1460, the forward direction of the light 4-L may be adjusted by the rotation or the movement of the second optical element 4-1470.

Similarly, to ensure that as much the light 4-L as possible is received within the range of the third optical element 4-1480, the third optical element 4-1480 is located on the side of the second optical element 4-1470, and the position of the third optical element 4-1480 corresponds to the position of the second optical element 4-1470. More than one the third optical element 4-1480 may be placed depends on requirements. The third optical element 4-1480 may also correspond to a light-detection element (not shown) located outside the periscope optical module 4-1450 so that the light 4-L is imaged on the light-detection element.

The first optical element 4-1460 and the third optical element 4-1480 may be a lens or the like and may be made of glass, resin or the like. The optical elements made of glass may have better optical performance than the optical elements made of resin, but may be heavier. Since the space for placing the third optical element 4-1480 is more restricted than the space for placing the first optical element 4-1460, the heavy third optical element 4-1480 is usually unwanted. Thus, the first optical element 4-1460 made of glass and the third optical element 4-1480 made of resin may be selected, but any suitable material may be selected according to actual requirements.

Furthermore, the first optical element 4-1460 may be a convex lens (such as a concavo-convex lens), so the focal length of the first optical element 4-1460 is positive, and the light 4-L passing through the first optical element 4-1460 converges. Meanwhile, the third optical element 4-1480 may be a concave lens (such as a convexo-concave lens, a plano-concave lens, or a concavo-concave lens), so the focal length of the third optical element 4-1480 is negative, and the light 4-L passing through the third optical element 4-1480 diverges. Alternatively, the focal length of the first optical element 4-1460 may be negative and the focal length of the third optical element 4-1480 may be positive.

In some embodiments, the periscope optical module 4-1450 further includes an aperture (not shown). The aperture provides an adjustable opening to control the amount of the light 4-L so as to affect the depth of field (DOF) of the image. When the DOF decreased, only the objects near the periscope optical module 4-1450 are clear. The aperture may be disposed between the first optical element 4-1460 and the second optical element 4-1470. Or, the aperture may be disposed between the second optical element 4-1470 and the third optical element 4-1480.

The first optical element 4-1460 has a first optical axis 4-1461, and the first optical axis 4-1461 is an imaginary axis passing through the center of the first optical element 4-1460. The third optical element 4-1480 has a second optical axis 4-1481, and the second optical axis 4-1481 is an imaginary axis passing through the center of the third optical element 4-1480. The first optical axis 4-1461 is not parallel to the second optical axis 4-1481. In this embodiment, the first optical axis 4-1461 is substantially perpendicular to the second optical axis 4-1481 due to the arrangement of the first optical element 4-1460 and the third optical element 4-1480. It should be noted that the first optical axis 4-1461 may be not perpendicular to the second optical axis 4-1481 because of vibration or other reasons.

Since the holder 4-1462 is disposed on the second optical element 4-1470, the holder 4-1462 overlaps the second optical element 4-1470 when viewed along the first optical axis 4-1461.

Figure 4:
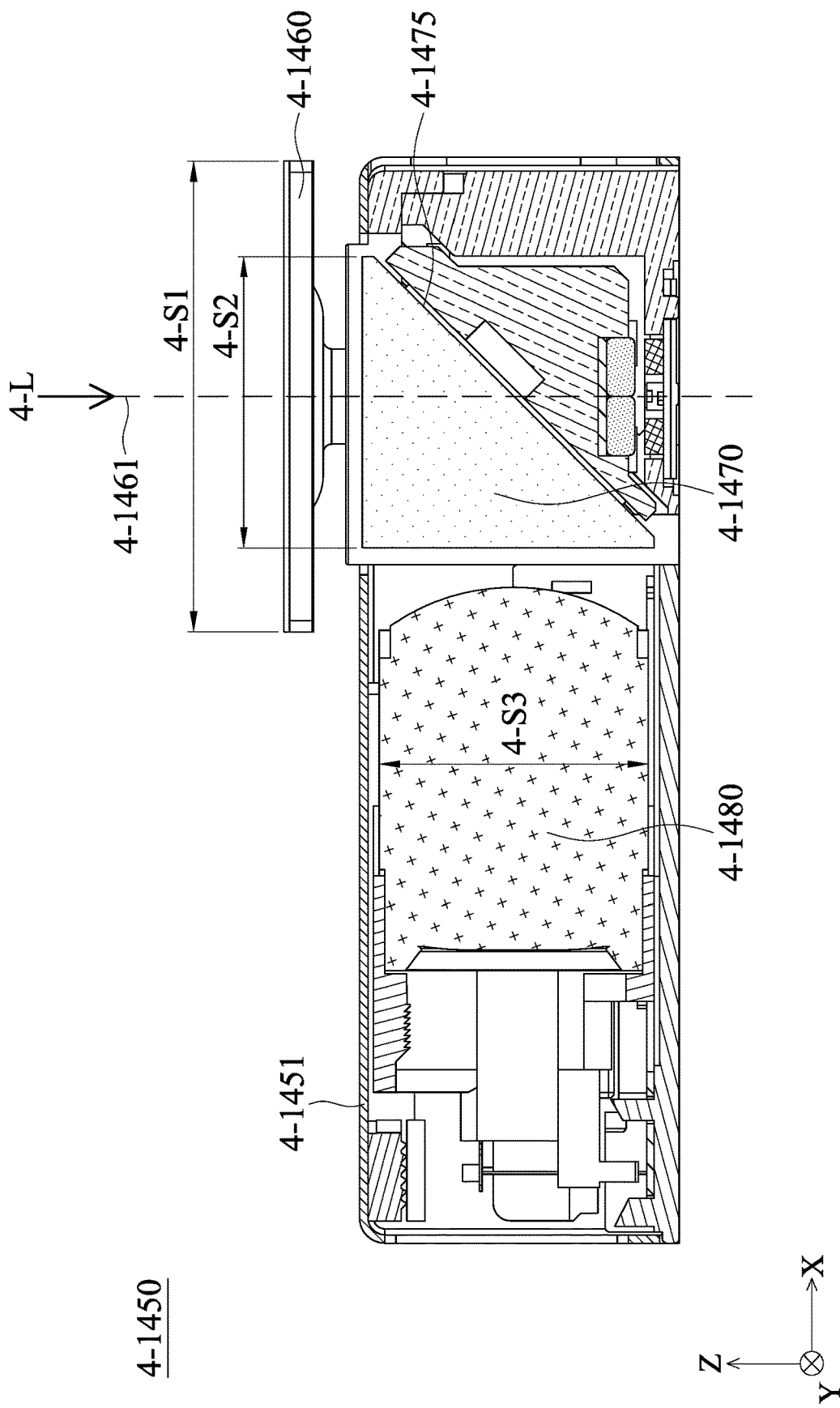
FIG. 4 is a side view of the periscope optical module in FIG. 3.

FIG. 4 is a side view of the periscope optical module 4-1450 in FIG. 3. As shown in FIG. 4, a minimum size 4-S1 of the first optical element 4-1460 in the direction that is perpendicular to the first optical axis 4-1461 is larger than a maximum size 4-S3 of the third optical element 4-1480 in the direction of the first optical axis 4-1461.

By such configuration, the thickness of the periscope optical module 4-1450 is not affected by the minimum size 4-S1 of the first optical element 4-1460 in the direction that is perpendicular to the first optical axis 4-1461. Therefore, the first optical element 4-1460 with a long focal length may be placed under the circumstance that miniaturization of the periscope optical module 4-1450 is also taken into consideration. Furthermore, the quality of the image may be enhanced because the first optical element 4-1460 and third optical element 4-1480 have different focal lengths and different sizes.

To illustrate clearly, "the size" of the optical element actually refers to "the effective optical area" of the optical element. When an image is formed, the size of the image is not proportional to the actual size of the optical element, but proportional to the effective optical area. "The effective optical area" of the optical element means the area that the light actual passes and may be imaged.

For example, the effective optical area may not equal to the actual size of the first optical element 4-1460 because the periphery of the first optical element 4-1460 may be shielded by the holder 4-1462 for receiving the first optical element 4-1460. For such circumstance, the minimum size 4-S1 of the first optical element 4-1460 means the minimum size of the first optical element 4-1460 not shielded by the holder 4-1462 in the direction that is perpendicular to the first optical axis 4-1461, not the actual size of the first optical element 4-1460 in the direction that is perpendicular to the first optical axis 4-1461.

Therefore, the minimum size 4-S1 of the first optical element 4-1460 is larger than the maximum size 4-S3 of the third optical element 4-1480 means the effective optical area of the first optical element 4-1460 is larger than the effective optical area of the third optical element 4-1480.

Figure 5:
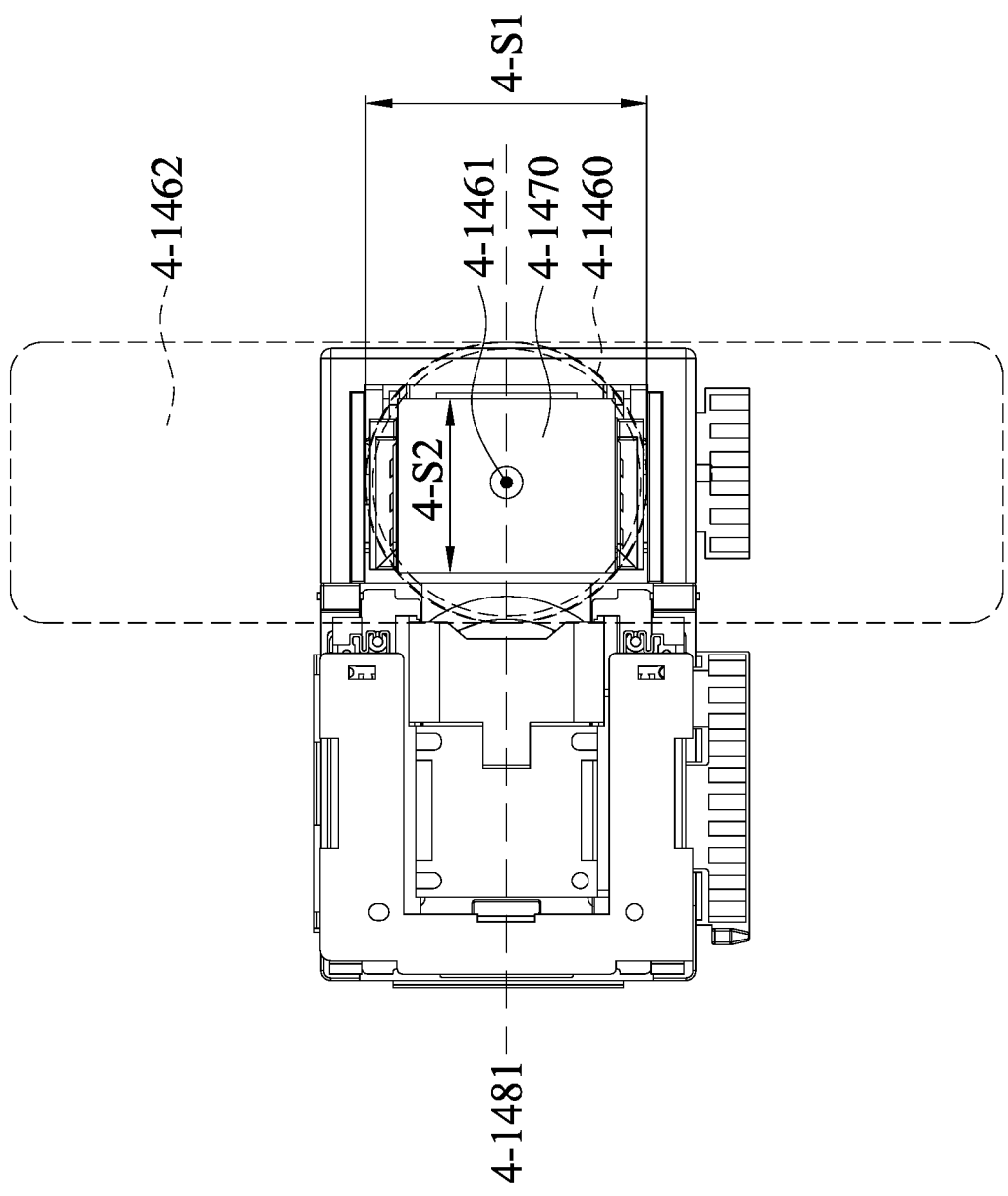
FIG. 5 is a top view of the periscope optical module in FIG. 3.

FIG. 5 is a top view of the periscope optical module 4-1450 in FIG. 3. As shown in FIG. 5, the minimum size 4-S1 of the first optical element 4-1460 in the direction that is perpendicular to the first optical axis 4-1461 is larger than a maximum size 4-S2 of the second optical element 4-1480 in the direction of the second optical axis 4-1481. Yet, a reflecting surface 4-1475 of the second optical element 4-1470 is larger than or equal to the cross-sectional area of the light 4-L after passing through the first optical element 4-1460 to avoid a portion of the light 4-L is not reflected.

It should be noted that in some embodiments, the cross-sectional area of the light 4-L shrinks when the light 4-L passes through the first optical element 4-1460, the second optical element 4-1470, and the third optical element 4-1480 due to the intrinsic properties of the light 4-L such as refraction or reflection. For example, when the light 4-L passes through the first optical element 4-1460, the second optical element 4-1470, and the third optical element 4-1480, the profile of the light 4-L may be conical and the cross-sectional area of the light 4-L shrinks.

Furthermore, the maximum size 4-S2 of the second optical element 4-1470 in the direction of the second optical axis 4-1481 may be designed to be larger than the maximum size 4-S3 of the third optical element 4-1480 in the direction of the first optical axis 4-1461. By such design, the size of the periscope optical module 4-1450 in the direction of the first optical axis 4-1461 may be reduced, i.e. the thickness of the periscope optical module 4-1450 may be reduced.

Figure 6:
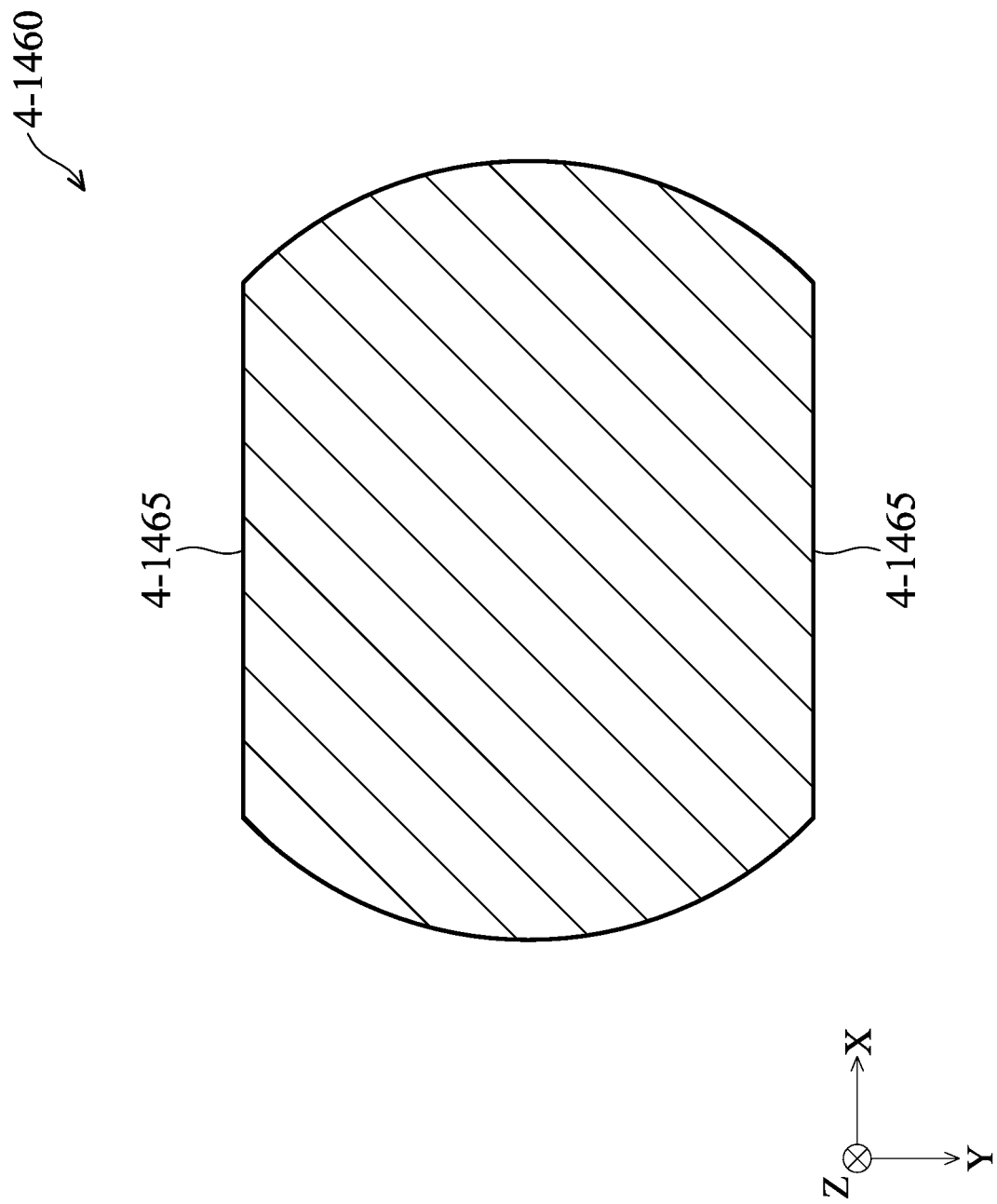
FIG. 6 is a schematic view of a first optical element in accordance with some embodiments of this disclosure.

FIG. 6 is a schematic view of the first optical element 4-1460 in accordance with some embodiments of this disclosure. As shown in FIG. 6, to reduce production cost, lower the weight of the periscope optical module 4-1450 or reduce the thickness of the periscope optical module 4-1450, the first optical element 4-1460 includes two cutting portions 4-1465 formed in the opposite sides of the first optical element 4-1460. The cutting portions 4-1465 may be formed by cutting process or the like. It should be noted that the third optical element 4-1480 may also have similar shape.

It should be mentioned that a portion of the light 4-L may exceed the light-detection element and thus may not be imaged because the shape of the light-detection element is different than the shape of the light 4-L or other reasons. Therefore, the quality of the image is not affected just because the first optical element 4-1460 includes the cutting portions 4-1465.

Figure 7:
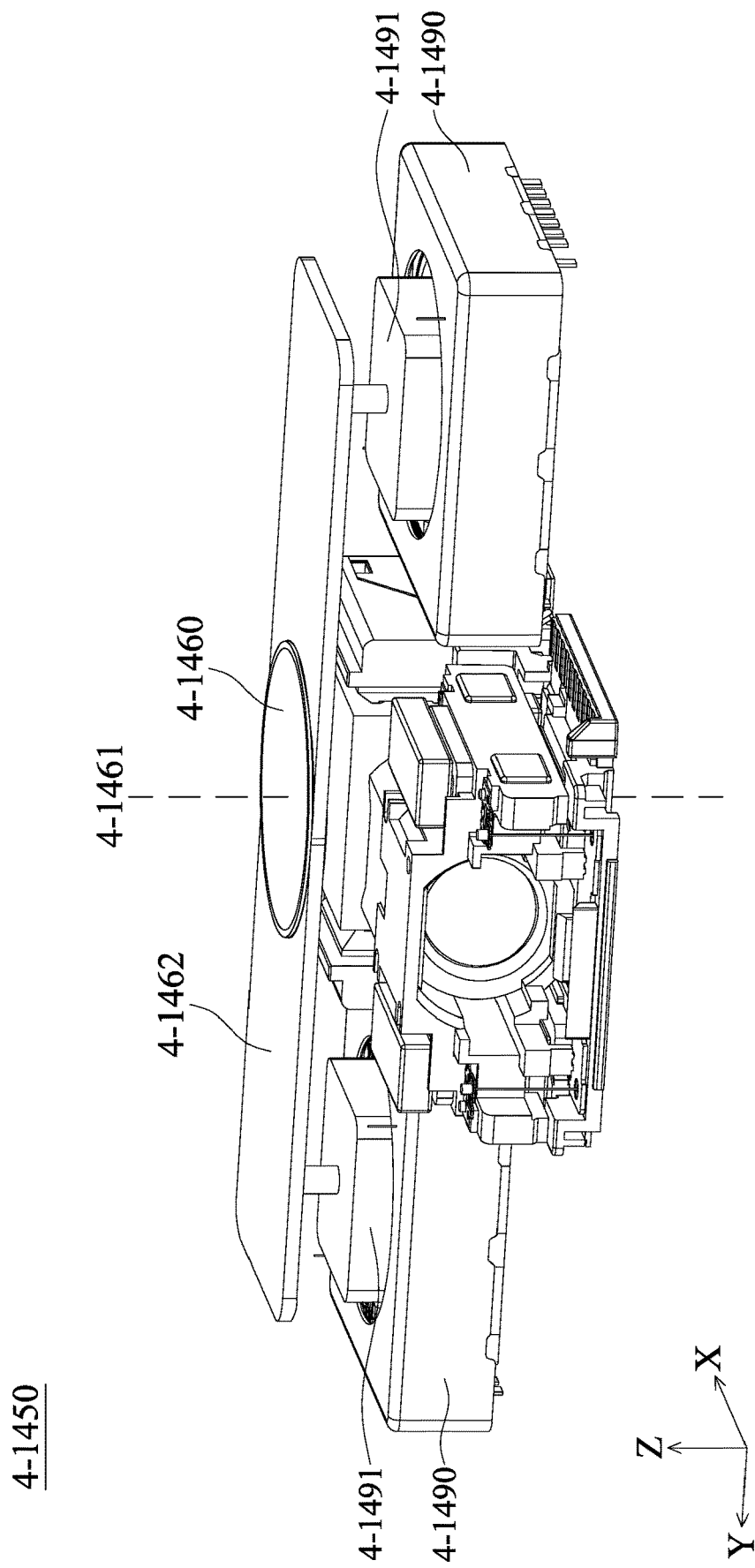
FIG. 7 is a perspective view of the periscope optical module with a first driving assembly.

FIG. 7 is a perspective view of the periscope optical module 4-1450 with a first driving assembly 4-1490. The first optical element 4-1460 may be driven by the first driving assembly 4-1490 to move relative to the second optical element 4-1470. Next, how the first driving assembly 4-1490 works is described in detail. However, the first driving assembly 4-1490 may be omitted and the holder 4-1462 may be affixed by adhesion and the like.

The first driving assembly 4-1490 includes two driving members 4-1491 connecting to and support the holder 4-1462. The movement of the driving members 4-1491 may also drive the holder 4-1462 so that the first optical element 4-1460 may move in different directions (such as X-axis, Y-axis, or Z-axis in the drawings) to achieve auto focus (AF) and optical image stabilization (OIS), respectively. For example, the two driving members 4-1491 may move the same distance toward the first optical axis 4-1461 so that the first optical element 4-1460 may also move toward the first optical axis 4-1461 to achieve AF. In this embodiment, in order to stabilize or balance the first optical element 4-1460 with larger effective optical area (and thus may be heavier), two driving members 4-1491 are used, but the number of the driving members 4-1491 may be changed.

The second optical element 4-1470 is located between the two driving members 4-1491 when viewed along the direction that is perpendicular to the first optical axis 4-1461. Additionally, the driving members 4-1491 of the first driving assembly 4-1490 partially overlaps the second optical element 4-1470 but not overlaps the first optical element 4-1460 when viewed along the direction that is perpendicular to the first optical axis 4-1461.

In addition to the methods for driving the first optical element 4-1460 by the driving members 4-1491, the first driving assembly 4-1490 may include electromagnetic elements, bias elements made of shape memory alloys (SMA), or smooth impact drive mechanisms (SIDM) or the like.

If the first driving assembly 4-1490 is electromagnetic type, then the first driving assembly 4-1490 may include elements such as a coil, a magnetic element, etc. When a current is supplied to the coil, electromagnetic induction may occur between the coil and the magnetic element so as to generate electromagnetic force to drive the first optical element 4-1460 to move.

If the first driving assembly 4-1490 includes bias elements made of SMA, the bias elements may connect to the holder 4-1462. SMA material deforms according to temperature change. Thus, a driving signal (such as current or voltage) may be supplied to the bias elements by a power supply to control the temperature of the bias elements to change the length of the bias elements so as to drive the first optical element 4-1460 to move.

If the first driving assembly 4-1490 is a SIDM, then the first driving assembly 4-1490 may include piezoelectric assembly, moving object, etc. The volume change of the piezoelectric assembly and the inertia and the friction force of the moving object drive the first optical element 4-1460 to move.

Additionally, the configurations of the first driving assembly 4-1490 are not limited to the aforementioned embodiments. FIG. 8 to FIG. 13 are different configurations of the first driving assembly 4-1490 in accordance with some embodiments of this disclosure. It should be noted that FIG. 8 to FIG. 13 are much simplified. The positions of the first optical element 4-1460, the second optical element 4-1470, and the third optical element 4-1480 are relatively the same, and the elements may have structures the same as or similar to the aforementioned embodiments.

As shown in FIG. 8, the first driving assembly 4-1490 may be disposed above the third optical element 4-1480 so that the first driving assembly 4-1490 overlaps the third optical element 4-1480 when viewed along the direction of the first optical axis 4-1461. Also, the first driving assembly 4-1490 does not overlap the third optical element 4-1480.

As shown in FIG. 9, the first driving assembly 4-1490 may be disposed adjacent to the second optical element 4-1470 so that the second optical element 4-1470 is located between the third optical element 4-1480 and the first driving assembly 4-1490 when viewed along the direction that is perpendicular to the first optical axis 4-1461. Also, the first driving assembly 4-1490 does not overlap the first optical element 4-1460 when viewed along the direction of the second optical axis 4-1481.

As shown in FIG. 10, the first driving assembly 4-1490 may be disposed below the second optical element 4-1470 so that the second optical element 4-1470 is located between the first optical element 4-1460 and the first driving assembly 4-1490 when viewed along the direction of the first optical axis 4-1461. Also, the first driving assembly 4-1490 does not overlap the first optical element 4-1460 and the third optical element 4-1480 when viewed along the direction of the second optical axis 4-1481.

As shown in FIG. 11, the first driving assembly 4-1490 may be disposed adjacent to the third optical element 4-1480 so that the third optical element 4-1480 is located between the second optical element 4-1470 and the first driving assembly 4-1490 when viewed along the direction that is perpendicular to the first optical axis 4-1461. Also, the first driving assembly 4-1490 overlaps the third optical element 4-1480 when viewed along the direction of the second optical axis 4-1481.

As shown in FIG. 12, the configuration of FIG. 12 is similar to that of FIG. 11. The difference is that the first driving assembly 4-1490 spaced a distance apart from the third optical element 4-1480.

As shown in FIG. 13, in this embodiment, an optical element driving module similar to the optical element driving module 4-1410 of FIG. 2 is used for receiving the first optical element 4-1460. The first driving assembly 4-1490 for driving the first optical element 4-1460 may be omitted because the optical element driving module 4-1410 includes a driving mechanism for driving the first optical element 4-1460 inside.

Figure 14:
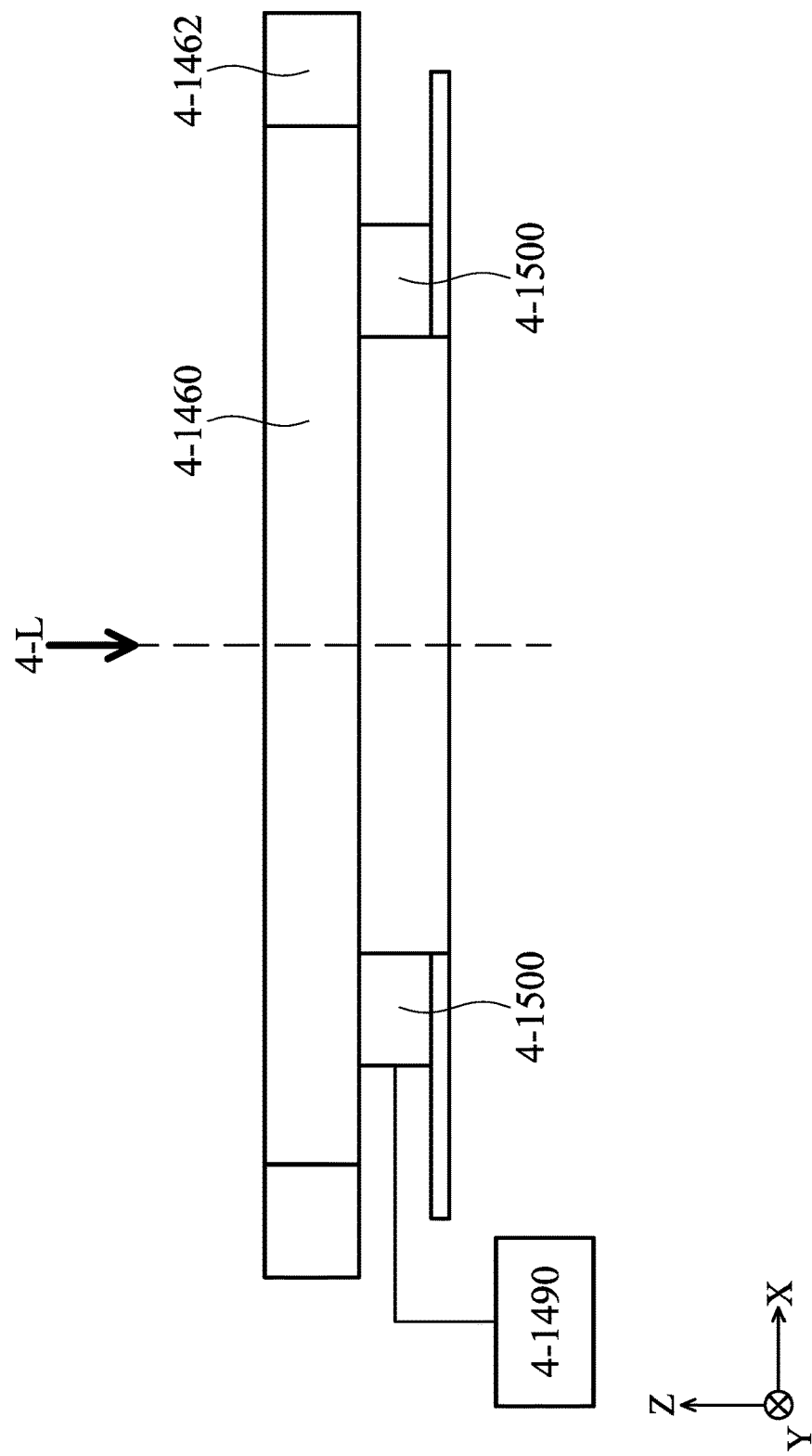
FIG. 14 is a schematic view of a liquid lens driving assembly.
Figure 15:
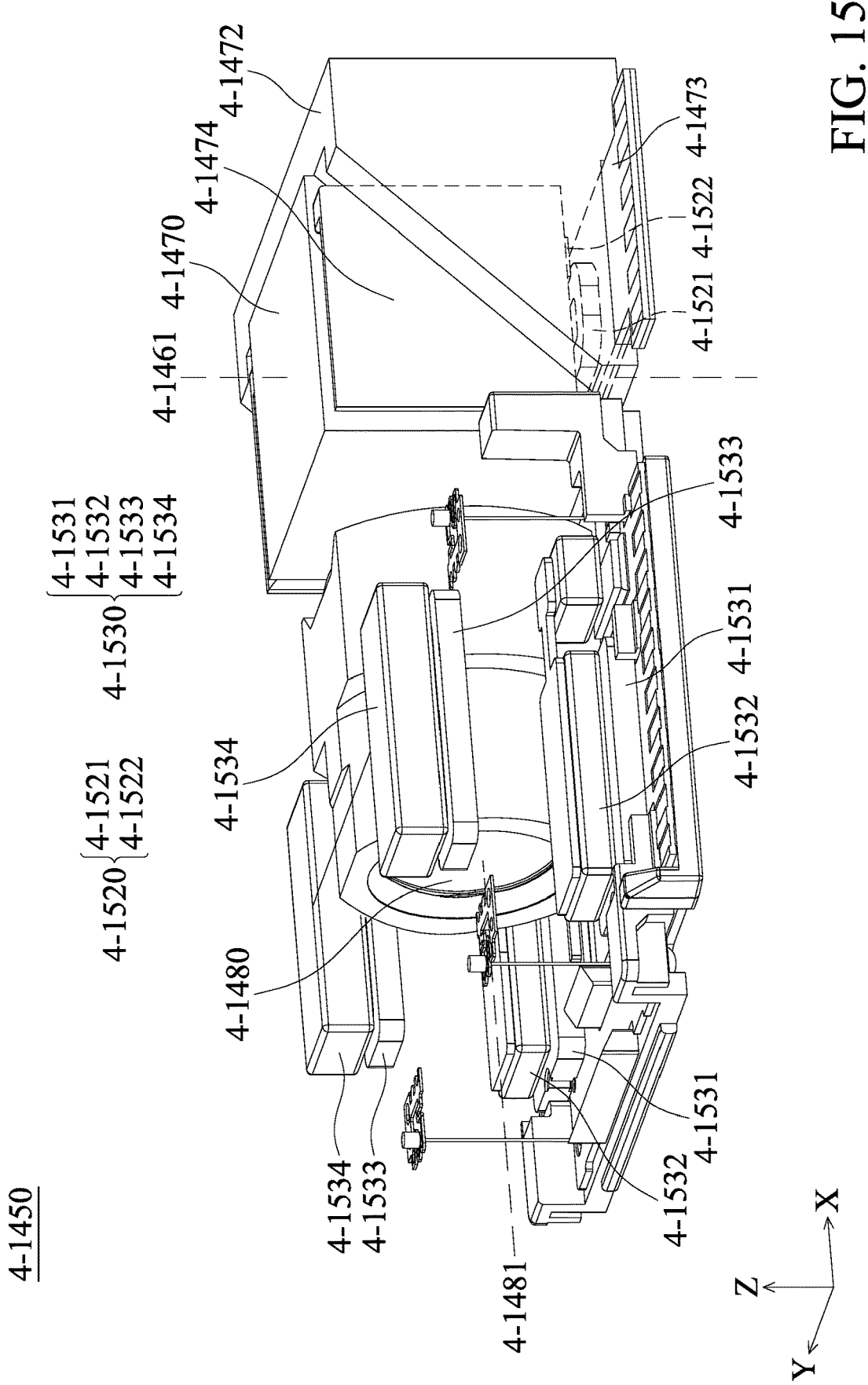
FIG. 15 is a schematic view of a second driving assembly and a third driving assembly.

FIG. 14 is a schematic view of a liquid lens driving assembly 4-1500. In FIG. 14, the first optical element 4-1460 is a liquid lens. Liquid lenses are lenses that the medium is liquid. The focal length of the first optical element 4-1460 may be changed by the liquid lens driving assembly 4-1500 via rotation or squeeze. Furthermore, the first driving assembly 4-1490 may be used for driving the liquid lens driving assembly 4-1500 so that the first driving assembly 4-1490 drives the first optical element 4-1460 (as a liquid lens in this embodiment) and the liquid lens driving assembly 4-1500 to move relative to the second optical element 4-1470 at the same time FIG. 15 is a schematic view of a second driving assembly 4-1520 and a third driving assembly 4-1530. To show clearly, some elements are omitted in FIG. 15. In addition to the first driving assembly 4-1490, the periscope optical module 4-1450 may include the second driving assembly 4-1520 and/or the third driving assembly 4-1530. The second driving assembly 4-1520 drives the second optical element 4-1470 to move or rotate. The third driving assembly 4-1530 drives the third optical element 4-1480 to move relative to the second optical element 4-1470.

It should be noted that the term "the first" driving assembly 4-1490, "the second" driving assembly 4-1520, and "the third" driving assembly 4-1530 do not represent the order or the necessities of different driving assemblies. That is, it does not represent the periscope optical module 4-1450 has to include the first driving assembly 4-1490 to further include the second driving assembly 4-1520. It does not represent the periscope optical module 4-1450 has to include the second driving assembly 4-1520 to further include the third driving assembly 4-1530, either. The driving assemblies are arranged or used depends on the requirements. In some embodiments, the periscope optical module 4-1450 only includes one or two of the first driving assembly 4-1490, the second driving assembly 4-1520, and the third driving assembly 4-1530. For example, the periscope optical module 4-1450 may merely include the third driving assembly 4-1530 for driving the third optical element 4-1480 to move relative to the second optical element 4-1470 while the first driving assembly 4-1490 and the second driving assembly 4-1520 are omitted.

As shown in FIG. 15, the periscope optical module 4-1450 includes a bottom 4-1472, a circuit board 4-1473, and a holding piece 4-1474. The bottom 4-1472 corresponds to the second optical element 4-1470. The circuit board 4-1473 is disposed on the bottom 4-1472. The holding piece 4-1474 may hold the second optical element 4-1470. In this embodiment, the second driving assembly 4-1520 is electromagnetic type, including a coil 4-1521 and a magnetic element 4-1522. The coil 4-1521 is disposed on the circuit board 4-1473 and the magnetic element 4-1522 is disposed on the holding piece 4-1474. Alternatively, the position of the coil 4-1521 and the position of the magnetic element 4-1522 may be exchanged. The generated electromagnetic force between the coil 4-1521 and the magnetic element 4-1522 may drive the second optical element 4-1470 to move or rotate so as to change the forward direction of the light 4-L. For example, the second optical element 4-1470 may rotate around a direction that is perpendicular to the first optical axis 4-1461 and the second optical axis 4-1481.

It should be noted that the first driving assembly 4-1490 include multiple types with regard to the discussion about FIG. 8 to FIG. 13. When the first driving assembly 4-1490 and the second driving assembly 4-1520 are both electromagnetic type, the second driving assembly 4-1520 is not disposed on the side of the bottom 4-1472 adjacent to the first driving assembly 4-1490 to avoid magnetic interference.

The third driving assembly 4-1530 may include configurations the same as or similar to the first driving assembly 4-1490. As described above, for driving the third optical element 4-1480, the third driving assembly 4-1530 may include electromagnetic type, bias elements made of SMA, SIDM, etc.

In this embodiment the third driving assembly 4-1530 includes two coils 4-1531, two magnetic elements 4-1532, two coils 4-1533, and two magnetic elements 4-1534. The generated electromagnetic force between the coils 4-1531 and the magnetic elements 4-1532 may drive the third optical element 4-1480 to move along the direction of the second optical axis 4-1481 to achieve AF. The generated electromagnetic force between the coils 4-1533 and the magnetic elements 4-1534 may drive the third optical element 4-1480 to move along the direction that is not parallel to the second optical axis 4-1481 to achieve OIS.

Figure 16:
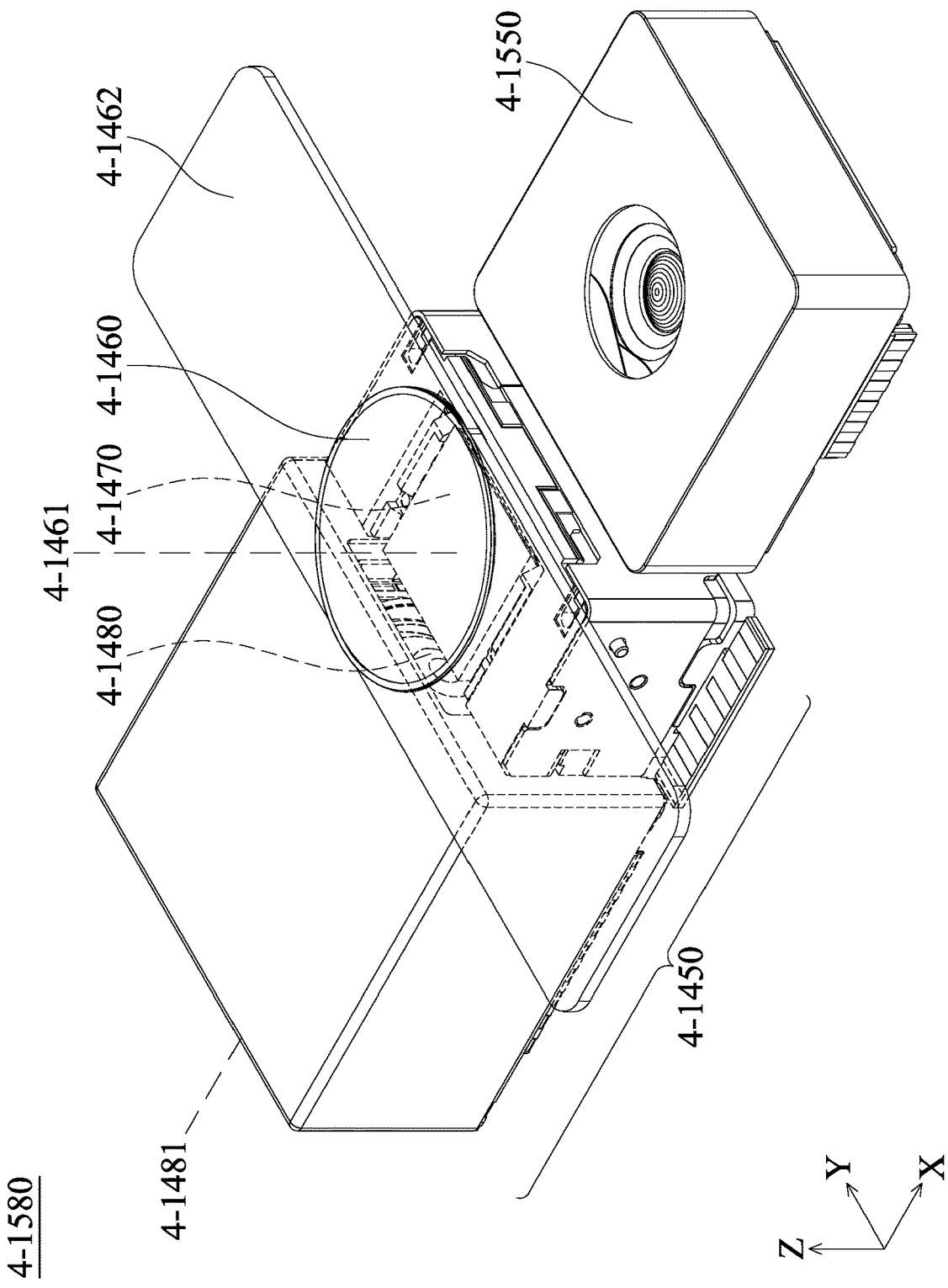
FIG. 16 and FIG. 17 are schematic views of an optical system in accordance with some embodiments of this disclosure.
Figure 17:
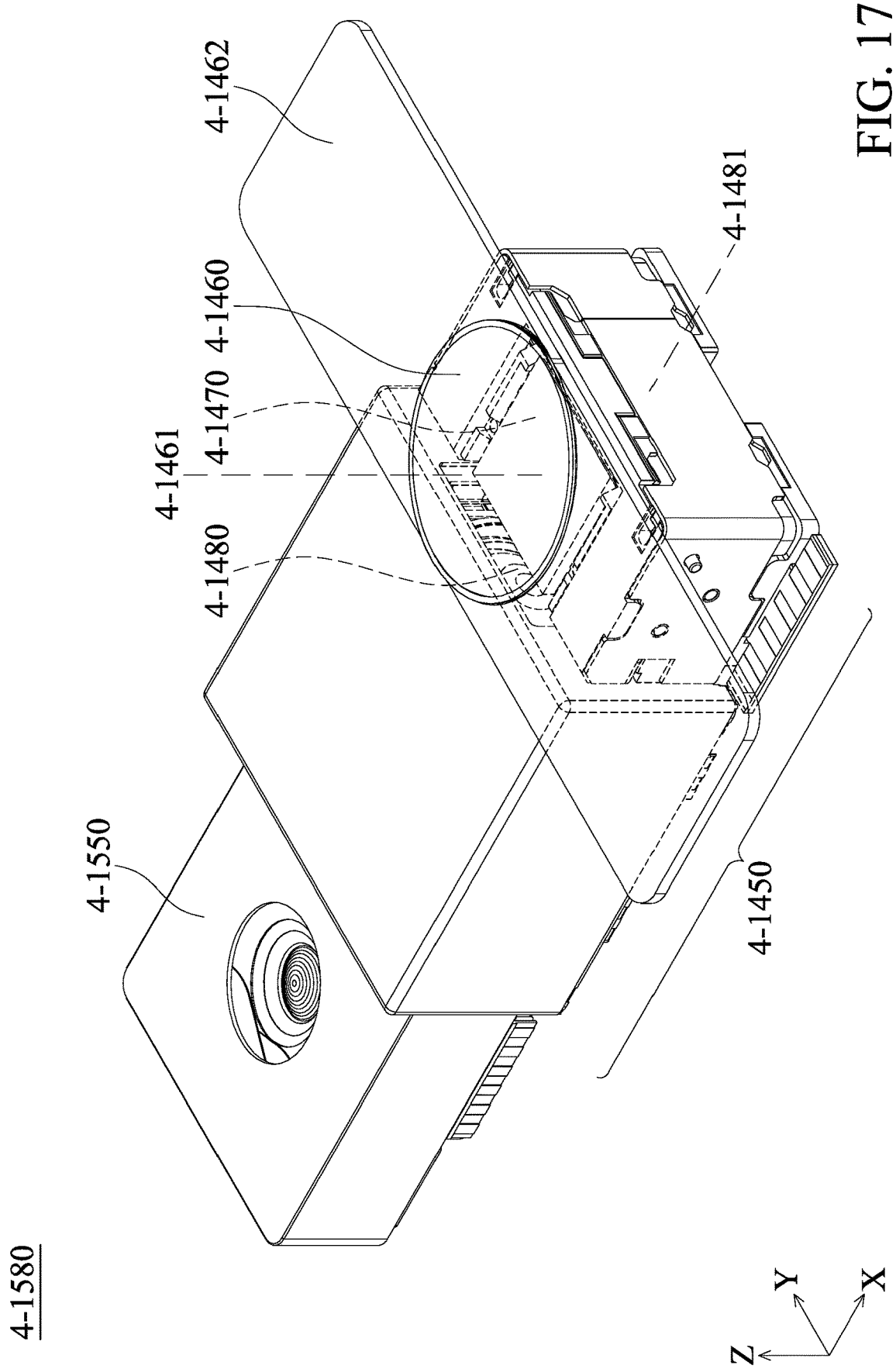

FIG. 16 and FIG. 17 are schematic views of an optical system 4-1580 in accordance with some embodiments of this disclosure. The optical system 4-1580 may be disposed in an electronic device as the electronic device 4-1401 shown in FIG. 1 while the optical system 4-1402 is replaced with the optical system 4-1580. The optical system 4-1580 includes the periscope optical module 4-1450 and an optical element driving module 4-1550. The optical element driving module 4-1550 may be similar to the optical element driving module 4-1410 as shown in FIG.1. The optical element driving module 4-1550 may be disposed in different positions.

As shown in FIG. 16, the optical element driving module 4-1550 is disposed adjacent to the second optical element 4-1470 of the periscope optical module 4-1450. As shown in FIG. 17, the optical element driving module 4-1550 is disposed adjacent to the third optical element 4-1480 of the periscope optical module 4-1450. In FIG. 16 and FIG. 17, the optical element driving module 4-1550 and the second optical element 4-1470 are arranged along the direction that is perpendicular to the first optical axis 4-1461 and parallel to the second optical axis 4-1481. The periscope optical module 4-1450 and the optical element driving module 4-1550 may include a plurality of optical elements so that when the smart phone 4-1580 is used for shooting, targets such as light-detection, wide-angle, and long-focus may be achieved to enhance the quality of the image.

An improved periscope optical module is provided. Based on the present disclosure, an optical element with larger effective optical area may be disposed in an electronic device without increasing the thickness of the electronic device. Additionally, different assemblies may be used for drive the optical element to achieve displacement compensation and increase correction efficiency. Additional optical element driving module may also be used together with the periscope optical module of this disclosure to enhance the quality of image being photographed by the electronic device.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure.

In addition, the scope of this disclosure is not limited to the specific embodiments described in the specification, and each claim constitutes a separate embodiment, and the combination of various claims and embodiments are within the scope of the disclosure.

What is claimed is:

1. A periscope optical module, comprising:
a first optical element with a first optical axis;
a second optical element corresponding to the first optical element and adjusting a forward direction of a light; and
a third optical element with a second optical axis, wherein the third optical element corresponds to the second optical element;
wherein the light passes through the first optical element, the second optical element, and the third optical element consecutively and the first optical axis is perpendicular to the second optical axis;
wherein a minimum size of the first optical element in a direction that is perpendicular to the first optical axis is larger than a maximum size of the third optical element in a direction of the first optical axis.

2. The periscope optical module as claimed in claim 1, wherein the minimum size of the first optical element in the direction that is perpendicular to the first optical axis is larger than a maximum size of the second optical element in a direction of the second optical axis.

3. The periscope optical module as claimed in claim 2, wherein the maximum size of the second optical element in the direction of the second optical axis is larger than the maximum size of the third optical element in the direction of the first optical axis.

4. The periscope optical module as claimed in claim 1, wherein a focal length of the first optical element is positive and a focal length of the third optical element is negative.

5. The periscope optical module as claimed in claim 1, wherein a focal length of the first optical element is negative and a focal length of the third optical element is positive.

6. The periscope optical module as claimed in claim 1, further comprising an aperture located between the first optical element and the second optical element or between the second optical element and the third optical element.

7. The periscope optical module as claimed in claim 1, wherein at least one of the first optical element and the third optical element comprises a cutting portion.

8. The periscope optical module as claimed in claim 1, further comprising a holder holding the first optical element, wherein the holder overlaps the second optical element when viewed along the first optical axis.

9. The periscope optical module as claimed in claim 1, further comprising a first driving assembly driving the first optical element to move relative to the second optical element.

10. The periscope optical module as claimed in claim 9, wherein the first driving assembly further comprises a plurality of driving components, and the second optical element is located between the driving components when viewed along a direction that is perpendicular to the first optical axis.

11. The periscope optical module as claimed in claim 9, wherein the first driving assembly overlaps the third optical element when viewed along the first optical axis.

12. The periscope optical module as claimed in claim 9, wherein the second optical element is located between the first driving assembly and the third optical element when viewed along a direction that is perpendicular to the first optical axis.

13. The periscope optical module as claimed in claim 9, wherein the second optical element is located between the first driving assembly and the first optical element when viewed along the first optical axis.

14. The periscope optical module as claimed in claim 9, wherein the third optical element is located between the second optical element and the first driving assembly when viewed along a direction that is perpendicular to the first optical axis.

15. The periscope optical module as claimed in claim 9, further comprising a liquid lens driving assembly, wherein the first optical element comprises a liquid lens and the liquid lens driving assembly alters a focal length of the liquid lens.

16. The periscope optical module as claimed in claim 15, wherein the first driving assembly drives the liquid lens driving assembly and the liquid lens to move relative to the second optical element at the same time.

17. The periscope optical module as claimed in claim 9, further comprising a bottom and a second driving assembly, wherein the bottom corresponds to the second optical element, the second driving assembly is disposed on the bottom, and the second driving assembly drives the second optical element to move or rotate.

18. The periscope optical module as claimed in claim 17, further comprising a third driving assembly driving the third optical element to move relative to the second optical element.

19. An optical system, comprising:
a periscope optical module as claimed in claim 1; and
an optical element driving module;
wherein the optical element driving module and the second optical element are arranged along a direction that is perpendicular to the first optical axis.

20. An optical system, comprising:
a periscope optical module as claimed in claim 1; and
an optical element driving module;
wherein the optical element driving module and the second optical element are arranged along a direction that is parallel to the second optical axis.

* * * * *